United States Patent
Matei et al.

(10) Patent No.: US 11,163,919 B2
(45) Date of Patent: Nov. 2, 2021

(54) METHOD AND SYSTEM FOR COMPONENT-BASED DESIGN OF PHYSICAL SYSTEMS

(71) Applicant: Palo Alto Research Center Incorporated, Palo Alto, CA (US)

(72) Inventors: Ion Matei, Sunnyvale, CA (US); Maksym I. Zhenirovskyy, Mountain View, CA (US); Johan de Kleer, Los Altos, CA (US); Aleksandar B. Feldman, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 421 days.

(21) Appl. No.: 16/232,953

(22) Filed: Dec. 26, 2018

(65) Prior Publication Data
US 2020/0210532 A1     Jul. 2, 2020

(51) Int. Cl.
*G06F 30/00* (2020.01)
*G06F 111/20* (2020.01)

(52) U.S. Cl.
CPC .......... *G06F 30/00* (2020.01); *G06F 2111/20* (2020.01)

(58) Field of Classification Search
CPC ........ G06F 30/00; G06F 30/27; G06F 30/373; G06F 2111/20; G06F 30/20; G06F 30/30
USPC .......................................................... 703/1
See application file for complete search history.

(56) References Cited

U.S. PATENT DOCUMENTS

| | | | | |
|---|---|---|---|---|
| 5,452,239 A | * | 9/1995 | Dai | G06F 30/34 703/19 |
| 10,395,000 B1 | * | 8/2019 | Shu | G06F 30/398 |
| 2009/0132208 A1 | * | 5/2009 | Ukyo | G06F 30/15 703/1 |

OTHER PUBLICATIONS

Afzali-Kusha, Ali et al., "Substrate Noise Coupling in SoC Design: Modeling, Avoidance, and Validation", 2006, IEEE. (Year: 2006).*

(Continued)

*Primary Examiner* — Cedric Johnson
(74) *Attorney, Agent, or Firm* — Shun Yao; Park, Vaughan, Fleming & Dowler LLP.

(57) ABSTRACT

A method and system for automated design of a physical system are provided. During operation, the system obtains a component library comprising a plurality of physical components, receives design requirements of the physical system, and constructs an initial system model based on physical components in the component library and the design requirements. The system topology associated with the initial system model can include a large number of links that are sufficiently coupled to one another, and a respective link comprises one or more physical components. The system further performs an optimization operation comprising a plurality of iterations, with the system topology being updated at each iteration. Updating the system topology includes removing links and components from the system topology. The system then generates a final system model based on an outcome of the optimization operation and outputs a design solution of the physical system according to the final system model.

20 Claims, 15 Drawing Sheets

(56) References Cited

OTHER PUBLICATIONS

Schubert, Martin J., "An Analog-Node Model for VHDL-Based Simulation of RF Integrated Circuits", Dec. 2009, IEEE Transactions on Circuits and Systems I, Regular Papers, vol. 56, No. 12, IEEE. (Year: 2009).*

Yun, Ilgu, et al., "Extraction of Passive Device Model Parameters Using Genetic Algorithms", Mar. 1, 2000, ETRI Journal, vol. 22, No. 1. (Year: 2000).*

* cited by examiner

TYPE-I LINK

TYPE-II LINK

| Iteration | Number of variables |
|---|---|
| 0 | 104 |
| 1 | 34 |
| 2 | 29 |
| 3 | 36 |
| 4 | 15 |
| 15 | 13 |
| 22 | 12 |

FIG. 12

METHOD AND SYSTEM FOR COMPONENT-BASED DESIGN OF PHYSICAL SYSTEMS

BACKGROUND

Field

This disclosure is generally related to automated design of physical systems. More specifically, this disclosure is related to a system and method for providing a component-based automated design of physical systems.

Related Art

Design of physical systems can be the next frontier in artificial intelligence (AI). Providing automated tools for conceiving novel designs benefits many areas such as analog and digital circuit design, software development, mechanical system design, and systems engineering. Automated design tools can assist human designers to better navigate complex trade-offs, such as speed versus number of transistors versus heat dissipation in an integrated circuit (IC) chip. The human designers can choose from a richer base of trade-offs, thus having the potential to provide dramatic improvements in technology.

SUMMARY

One embodiment provides a method and a system for automated design of a physical system. During operation, the system obtains a component library comprising a plurality of physical components, receives design requirements of the physical system, and constructs an initial system model based on physical components in the component library and the design requirements. The system topology associated with the initial system model can include a large number of links that are sufficiently coupled to one another, and a respective link comprises one or more physical components. The system further performs an optimization operation comprising a plurality of iterations, with the system topology being updated at each iteration. Updating the system topology includes removing links and components from the system topology. The system then generates a final system model based on an outcome of the optimization operation and outputs a design solution of the physical system according to the final system model.

In a variation on this embodiment, the design requirements comprise boundary conditions and desired behaviors of the physical system.

In a variation on this embodiment, a respective component within the respective link is coupled to an adjacent node in the system topology via a selection switch, and a state of the selection switch indicates whether the respective component is removable from the system topology.

In a variation on this embodiment, performing the optimization operation further comprises solving a primal-dual optimization problem. Each iteration can include solving a primal optimization problem and updating at least one dual optimization variable.

In a further variation, solving the primal optimization problem can further include determining whether variables in the primal optimization problem exceed a predetermined number; if so, solving the primal optimization problem using a first-order method; and if not, solving the primal optimization problem using a second-order method.

In a further variation, the first-order method implements a gradient-descent algorithm, and the second-order method implements a quasi-Newton algorithm.

In a variation on this embodiment, generating the final system model can further include combining multiple components of a same type into a single component based on a topology relationship among the multiple components and updating parameters of physical components remaining in a final topology associated with the final system model without updating the final topology.

BRIEF DESCRIPTION OF THE FIGURES

FIG. 12 presents a table showing the number of optimization variables at different iterations of the dual problem, according to one embodiment.

In the figures, like reference numerals refer to the same figure elements.

DETAILED DESCRIPTION

Figure 1:
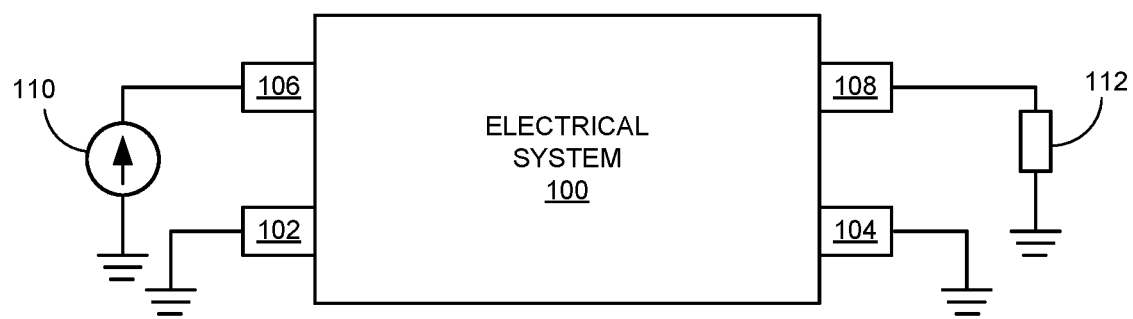
FIG. 1 shows exemplary modeling of an electrical system, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of automated design of physical systems. The automated design system can have a library of physical components (e.g., electrical or mechanical components) and the design process can start with constructing a sufficiently large system topology describing connections among the components. The system can then apply an optimization algorithm to eliminate redundant components in the system topology and learn the best parameters that can meet the design requirements. More specifically, the optimization algorithm can transform an initial multi-objective formulation of the optimization problem into a single objective, constrained nonlinear problem. The nonlinear, constrained optimization problem can be solved using a primal-dual approach. At each update of the dual optimization variables, a model reduction step can be executed to reduce the number of components and simplify the system model. The primal problems can be solved adaptively, where first-order methods are used when the number of parameters is large and second-order methods (e.g., quasi-Newton method) are used when the number of parameters decreases. Compared to current design solutions, the invented system can provide scalability and improve computation efficiency.

Automated Design of Physical Systems

A typical physical system can include physical components that are connected via physical connections (e.g., wires between electrical components or flanges between mechanical components) according to a system topology. Designing of a physical system can include selecting a set of components, determining how these components are connected, and determining parameters of these components. The designed physical system needs to meet a set of design requirements.

To quantify the design problem, the behavior of each physical component can be described by a set of constitutive equations, with the component being characterized by a set of physical parameters (e.g., resistance of a resistor). More specifically, in the system topology, each physical component can be modeled as a node having one or more ports, through which the component is interacting with other components. The ports can have physical variables, such as current and potential in the case of electrical components, and constraints, known as boundary conditions, exist for those physical variables. For example, electrical currents are flow variables that are conserved at connection points (i.e., flows sum up to zero); and electrical potentials at connection points are equal. The system topology can be described using a set of connection equations.

The constitutive equations of the components, together with the connection equations and the boundary conditions, induce the behavior of the system. A typical mathematical model for describing the behavior of a physical system can include a differential algebraic equation (DAE), such as F($\dot{x}$, x; β)=0, where x denotes the system's state and β is a vector of system parameters. The following discussion uses designing an electrical system as an example to describe the operation of an automated design system.

FIG. 1 shows exemplary modeling of an electrical system, according to one embodiment. Electrical system 100 can include a number of ports, such as ports 102, 104, 106, and 108, at its boundaries. In this example, ports 102 and 104 are connected to the ground, port 106 is connected to a current source 110, and port 108 is connected to a resistive load 112. These boundary ports together form the system interface. Through the system interface (i.e., the ports), electrical system 100 can exchange energy with other systems or the environment. The boundary conditions can also be set through the interface ports. For electrical system 100 shown in FIG. 1, the boundary conditions are set through voltage or current sources, ground connections, and connections to electrical loads (e.g., through ports 102-108).

The system requirements can often be expressed as specifications of the system interface (e.g., types and number of ports and behaviors of the ports). More specifically, the behavior requirements can be specified in terms of the behavior of physical variables at the interface ports (e.g., voltage or current). In the example shown in FIG. 1, the requirements for electrical system 100 can include a particular transient and steady state behavior of the potential at resistive load 112.

The behavior of the interface can be represented as time series or projections of the time series in the frequency domain. Let $\mathcal{Y} = \{y_{t_k}^{(i)}, k=0 \ldots N, i=1 \ldots m\}$ be the desired behavior, where the superscript i designates a physical variable at an interface port (e.g., ports 101-108), and $t_k$ is a time instant for the time series. Imposing a desired behavior to a design solution translates to minimizing a loss function defined as the mean squared error (MSE) between the desired behavior and the behavior generated by the design solution. The loss function can be denoted $$\mathcal{L} = \frac{1}{N}\sum_{k=0}^{N}\|y_{t_k} - \hat{y}_{t_k}\|^2, \text{ where } y_{t_k}^T = [y_{t_k}^{(1)}, \ldots, y_{t_k}^{(m)}]$$

is the vector of desired system outputs at $t_k$ and $\hat{y}_{t_k}$ is the vector of simulated outputs of the designed system.

In some embodiments, an automated approach can be used to find a design solution for a physical system, given a set of system requirements. More specifically, the automated design tool or system can perform the design task that was usually performed by humans, including selecting components, constructing system topology, and determining parameters of the components. The design system can start with a rich enough system topology describing connections among components. The initial system topology can include a sufficiently large number of components that are connected to each other. The design system learns the final topology of the desired physical system by pruning the initial system topology. More specifically, during the learning process, the design system can eliminate unnecessary components or connections within the system topology.

Figure 2:
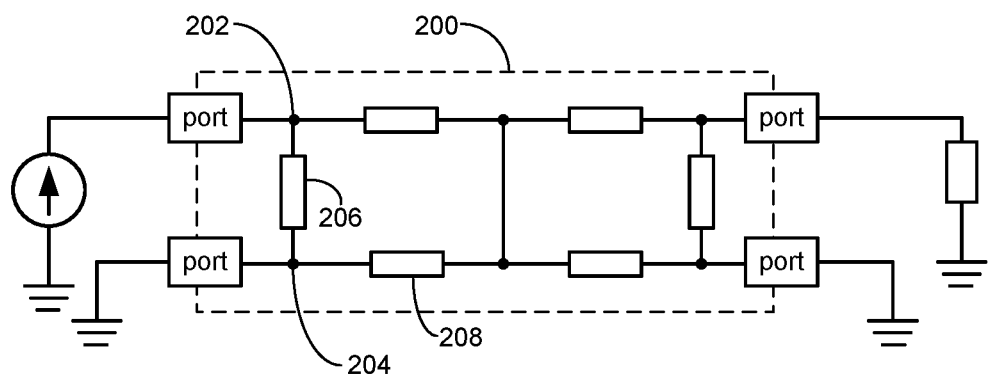
FIG. 2 illustrates an exemplary topology of an electrical system.

The topology of a physical system can be defined by an undirected graph G=(V, E), where V is the set of vertices and E is the set of edges. A vertex represents a connection point, and an edge represents a physical component. FIG. 2 illustrates an exemplary topology of an electrical system. In FIG. 2, electrical system 200 can be similar to electrical system 100 shown in FIG. 1. More specifically, the interface (e.g., ports) of electrical system 200 can be similar to that of electrical system 100. FIG. 2 shows that electrical system 200 can include a number of connection points (e.g., connection points 202 and 204) and interconnected components (e.g., components 206 and 208). The connection points can be the nodes (vertices) and the components can be the links (edges) in the graph.

Figure 3:
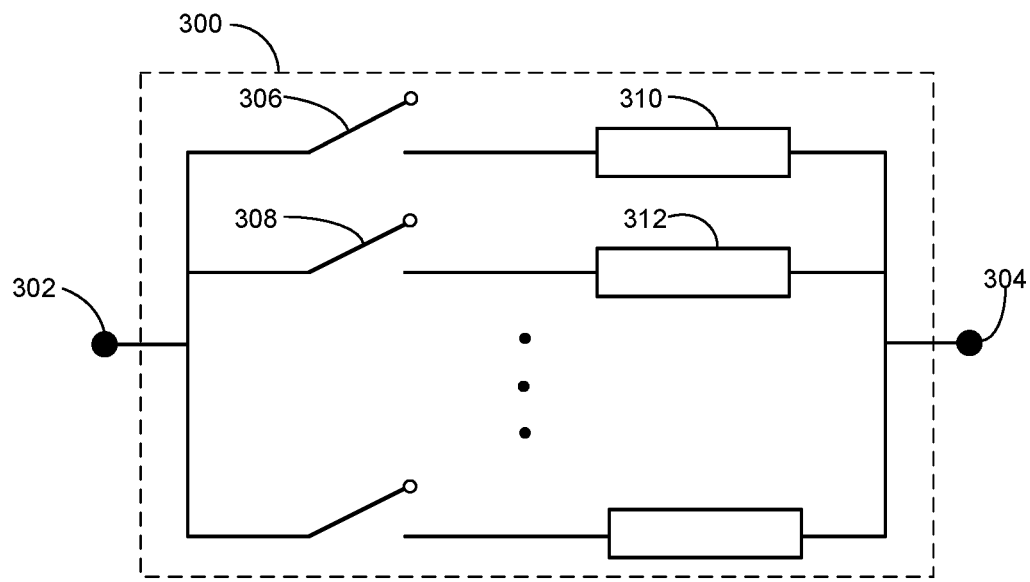
FIG. 3 illustrates an exemplary switching mechanism representing a link in the topology of a physical system, according to one embodiment.

During the initial learning, the components are unknown. To enable the automated design system to select, from a component library, one or more components, for each link in the system topology, the system can use a switching mechanism for selecting components. FIG. 3 illustrates an exemplary switching mechanism representing a link in the topology of a physical system, according to one embodiment.

In FIG. 3, link 300 is positioned between connection points 302 and 304 and can include a plurality of switches (e.g., switches 306 and 308) and and a plurality of components (components 310 and 312) of various types. More specifically, each component can be coupled to connection point 302 via a corresponding switch. For example, component 310 is coupled to connection point 302 via switch 306, and component 312 is coupled to connection point 302 via switch 308. As one can see in FIG. 3, the opening and closing of a switch can determine whether a corresponding component is included in link 300. For example, if switch 306 is closed, component 310 will be part of link 300; otherwise, component 310 is excluded from link 310. Therefore, the component selection problem becomes the problem of determining the opening/closing states of the switches.

Essentially the switches shown in FIG. 3 are decision variables that define which components are selected for a particular link. When expressed mathematically, the switches can be interpreted as integer binary variables, with value "1" representing a closed switch and value "0" representing an open switch. Other variables in the system can include physical parameters of the components. For example, one can use $\beta_i^T$ (where $\beta_i$ can be a vector) and $s_i$ to represent physical parameters and switch variables, respectively, of component i. The decision variable vector for a particular link can be denoted by $\beta^T=[\beta_1^T, \ldots, \beta_n^T]$ and $s^T=[s_1, \ldots, s_n]$, where n is the number of to-be-selected components.

In some embodiments, one of the design objectives is to find a parsimonious design solution, which implies choosing as few components as possible and learning their parameters, while making sure that the simulated behavior of the designed system is close to the system behavior set by the design requirements. The design problem can then be formulated as a multi-objective, mixed-integer optimization problem of the form:

$$\min_{\beta,s}\{\mathcal{L}(\beta, s), 1^T s\} \quad (1)$$

$$\text{s.t.} \quad s_i \in \{0, 1\}, i = 1 \ldots n \quad (2)$$

$$\beta_i \in B_i, i = 1 \ldots n, \quad (3)$$

where 1 is the vector of all ones and $B_i$ represents the set of constraints of physical parameters $\beta_i$. The first objective function of formula (1) ensures the design solution meets the requirements, and the second objective function of formula (1) ensures the selection of a minimum number of components.

In some embodiments, the aforementioned multi-objective optimization problem can be converted to a single-objective optimization problem with an additional inequality constraint. More specifically, the optimization problem expressed by formulas (1)-(3) can be expressed using the following formulas:

$$\min_{\beta,s} 1^T s \quad (4)$$

$$\text{s.t.:} \quad s_i \in \{0, 1\}, i = 1 \ldots n \quad (5)$$

$$\beta_i \in B_i, i = 1 \ldots n \quad (6)$$

$$\mathcal{L}(\beta, s) \le \varepsilon, \quad (7)$$

where $\varepsilon$ is a small positive scalar that defines a threshold for the behavior requirement. In other words, one of the objectives in formula (1) can be converted to a constraint represented by formula (7).

In some embodiments, the automated design system can obtain a solution for the single-objective optimization problem represented by formulas (4)-(7) using a primal-dual approach. More specifically, the primal optimization problem can be a mixed-integer optimization problem in the form of:

$$\min_{\beta,s} 1^T s + \lambda[\mathcal{L}(\beta, s) - \varepsilon] \quad (8)$$

$$\text{s.t.:} \quad s_i \in \{0, 1\}, i = 1 \ldots n \quad (9)$$

$$\beta_i \in B_i, i = 1 \ldots n, \quad (10)$$

while the dual problem can be given by:

$$\min_{\lambda} 1^T s + \lambda[\mathcal{L}(\beta, s) - \varepsilon] \quad (11)$$

$$\text{s.t.} \quad \lambda \ge 0. \quad (12)$$

In some embodiments, the design system obtains a solution for the dual problem using the projected gradient descent algorithm, expressed as: $\lambda'k+1=\lambda_k+\alpha_k[\mathcal{L}(\beta, s)-\varepsilon]$, where $\alpha_k$ is the iteration step. In this dual variable update scheme, the weight of the primal problem is adjusted based on the cost function $\mathcal{L}(\beta, s)$. When the cost function is far from its target, more weight is put on it in the primal problem. As the cost gets closer to its target, the weight of the primal problem is decreased.

There are many challenges arising from solving the mixed-integer problem in formulas (4)-(7), including the fact that mixed-integer problems explode in complexity when the number of parameters increases. In some embodiments, to mitigate such an effect, the mixed-integer optimization can be converted into a nonlinear problem with constraints. In the example shown in FIG. 3, an open switch implies cutting flow (e.g., current or force) through a corresponding component, meaning that the component is decoupled and does not contribute to the behavior of the physical system. The discrete switch can be converted into a continuous switch that implements the same effect, i.e., cutting the flow through a component that is not necessary in the designed system. For example, in an electrical system, the switch can be replaced by a conductor whose behavior is given by $i=g(v_1-v_2)$, where g is the conductance and $v_1-v_2$ is the voltage across the conductor. If the conductance g is very small, the current (flow) through the component associated with the conductor is negligible; therefore, the effect of the component is negligible as well.

Figure 4:
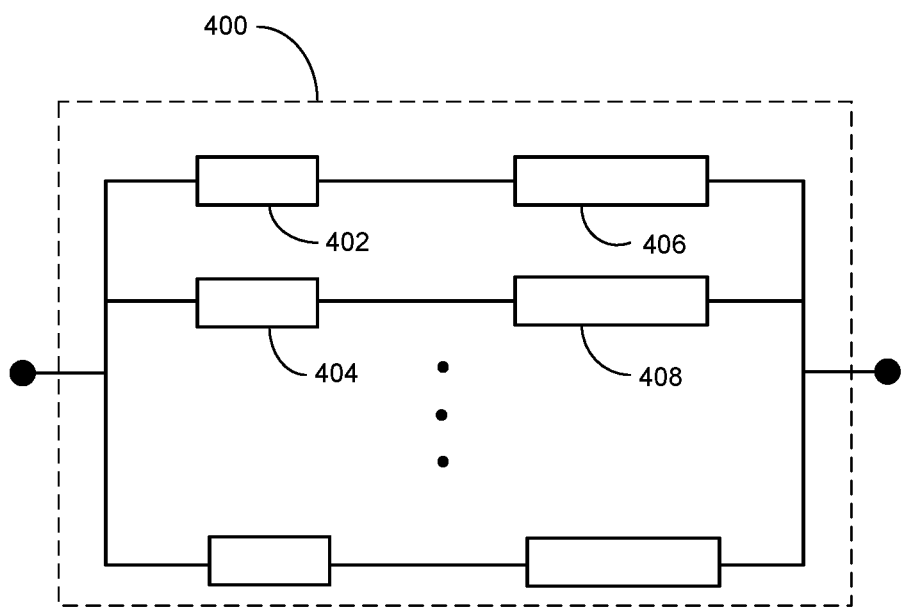
FIG. 4 illustrates an exemplary link where the binary switches are replaced with conductors, according to one embodiment.

FIG. 4 illustrates an exemplary link where the binary switches are replaced with conductors, according to one embodiment. More specifically, link 400 can include a number of parallel branches, with each branch including a selection-conductor (e.g., selection-conductors 402 and 404) and various types of components (e.g., components 406 and 408).

The conductance parameters can be "encouraged" to be small through an $l_1$ norm type of approach. Using g to represent the conductance vector of all selection-conductors, the optimization problem described by formulas (4)-(7) can become:

$$\min_{\beta,g} 1^T g \quad (13)$$

$$\text{s.t.} \quad g_i \geq 0, i = 1 \ldots n \quad (14)$$

$$\beta_i \in B_i, i = 1 \ldots n \quad (15)$$

$$\mathcal{L}(\beta, g) \leq \varepsilon. \quad (16)$$

If constraints in formula (15) are of the box type, then formulas (14) and (15) can be eliminated through variable transformations. For example, if $\beta_i^{min} \leq \beta_i \leq \beta_i^{max}$, one can perform the transformation $$\beta_i = \beta_i^{min} + [\sin(\tilde{\beta}_i) + 1]\frac{\beta_i^{max} - \beta_i^{min}}{2} \text{ and}$$

$$g_i = \sqrt{\tilde{g}_i^2 + 1} - 1,$$

and solve $$\min_{\tilde{\beta},\tilde{g}} \sum_{i=1}^{n} \left[\sqrt{\tilde{g}_i^2 + 1} - 1\right] \quad (17)$$

$$\text{s.t.} \quad \mathcal{L}(\tilde{\beta}, \tilde{g}) \leq \varepsilon. \quad (18)$$

Note that when $\beta_i$ is a vector, the transformation operations are performed for each entry in the vector. This approach can extend beyond the electrical domain. In the mechanical domain, the equivalent of a selection-conductor can be a spring described as $F=k(x_1-x_2)$. By making the spring constant k very small, no force will be generated.

Figure 5:
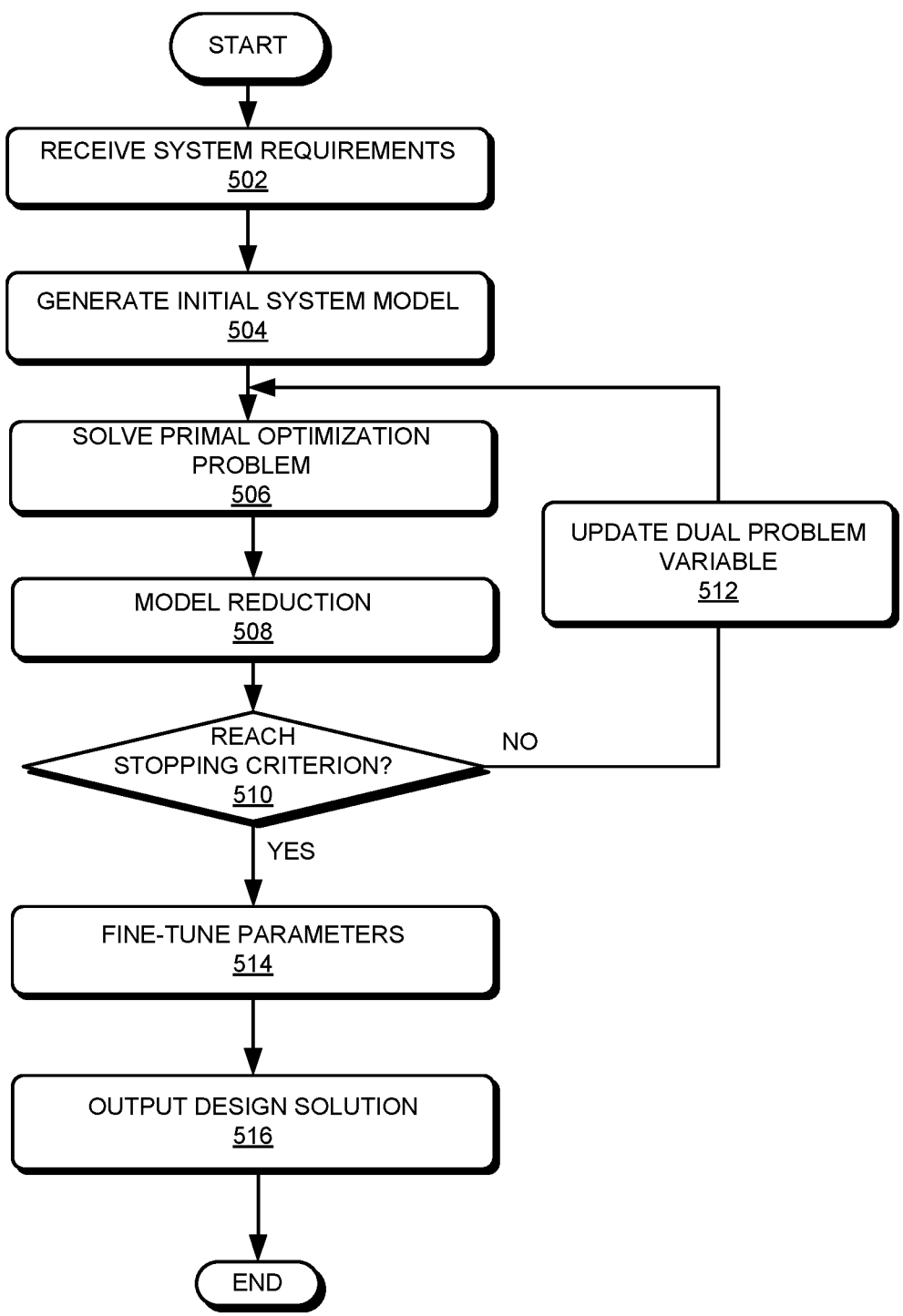
FIG. 5 presents a flowchart illustrating an exemplary process for automated design, according to one embodiment.

FIG. 5 presents a flowchart illustrating an exemplary process for automated design, according to one embodiment. During operation, the automated design system receives requirements of the physical system (operation 502) and generates an initial system model (operation 504). In some embodiments, the initial system model (e.g., the initial topology) can be generated based on a library of physical components and the requirements of the physical system. The system requirements can be expressed in terms of the boundary conditions of the system topology. These boundary conditions indicate how the physical system interfaces with the outside environment. Depending on the type of system being designed, the component library can include components of one or more domains, including but not limited to: electrical, mechanical, electromechanical, hydraulic, thermal, etc. The multi-domain component library can be obtained prior to the design process. The initial system topology can have a sufficiently large number of components that are richly connected. In some embodiments, the design system can set a default value of the number of links in the initial system topology. In some embodiments, this default value can be configured by the user. In alternative embodiments, this default value can be learned by the automated design system.

Each link in the topology can include multiple components coupled in parallel via selection switches, as shown in FIG. 3. The links in the initial topology can be diverse. In some embodiments, the system can generate multiple types of links, with each type including particular types and/or numbers of components. For example, if the to-be-designed system is an electrical circuit, a first type of link may include only resistors and capacitors, whereas a second type of link may include resistors, capacitors, and inductors. Alternatively, it is possible to have each initial link include all possible components that make up the system. For example, each initial link in an electrical circuit can include resistors, capacitors, and inductors. The switches in the link can select which component will remain in the final design. The initial parameters of the components can also be set at this stage.

The initial system topology and the system requirements can be sent into the optimization module, which can use various optimization approaches to optimize the topology (e.g., states of the switches) and parameters of the components. In some embodiments, a primal-dual approach can be used. More specifically, the automated design system can start the optimization operation by solving the primal optimization problem, given an initial optimization variable (i.e., the Lagrange multiplier λ) of the dual problem (operation 506) followed by the model reduction operation (operation 508). The model reduction process can include eliminating components and/or links based on the solution of the primal problem. More specifically, redundant components can be eliminated, leading to a reduction in complexity of the optimization problem. At each optimization iteration, the cost function $\mathcal{L}(\beta, s)$ is evaluated, which involves simulating the behaviors of the current system and comparing such behaviors to the design requirements.

Subsequent to model reduction, the automated design system determines whether a stopping criterion is reached (operation 510). The stopping criterion can be the difference between the simulated behavior of the current system and the desired behavior (e.g., the requirements). In some embodiments, determining whether the stopping criterion is met can include determining whether the loss function is smaller than a predetermined threshold. If the stopping criterion is not met, the system updates the optimization variable of the dual problem (operation 512) and continues to solve the primal problem using the updated variable of the dual problem (operation 506).

If the stopping criterion has been reached, the design system can further fine-tune the parameters of the components included in the current system topology (operation 514). In some embodiments, during the final parameter-tuning process, the system no longer updates the switching variables. In other words, the design system no longer optimizes the system topology. Instead, the design system continues to optimize the parameters of components within the system topology until the simulated behavior of the design system is sufficiently close to the desired system behavior. To do so, the switching states (i.e., s or g) are fixed during this operation, whereas component parameters (i.e., β) continue to be updated.

Subsequent to the final fine-tuning of the component parameters, the automated design system outputs the design solution (operation 516). The outputted design solution can allow a user to construct a physical system that meets the design requirements. Constructing the physical system can include obtaining physical components, configuring or tuning parameters of the physical components, and interconnecting these physical components according to the design solution.

Note that, on the rare occasion when the attempt to solve the optimization problem fails, the automated design system may need to start over by generating a different initial system model, which can include more links and more connections among the links than those of the previous initial system model. The automated design system can then perform operations similar to the ones shown in FIG. 5 to obtain a design solution.

The initial system model can include many components that are richly connected. Consequently, the optimization problem can have a large number of variables. The large-scale optimization problem can be hard to solve. During optimization, each primal solution finds values of the switches and the physical parameters of the components. Note that here the switch values are assumed to be continuous, as shown in FIG. 4. In some embodiments, the design system can reduce the number of optimization variables by tracking the switch values and eliminating switches that stabilize at zero. More specifically, the value of a switch can be considered as being stabilized at zero if the value of the switch remains close to zero after several iterations of the dual problem. In some embodiments, the design system can eliminate a switch and its corresponding coupled component when such a stabilization condition is detected using a threshold scheme (i.e., if $g_i \leq \delta$ is detected) Eliminating such switches and their corresponding components can result in a simpler system model.

If all switches on a link have been eliminated, the link can also be eliminated Eliminating links based on switch parameters can serve an additional purpose of improving numerical stability of model simulations. As some parameters become very small compared to other system parameters, the model becomes stiff. As the stiffness in the model increases, the system's Jacobian matrix used for simulation purposes can get closer to become singular. This can lead to increased simulation times and sometimes even simulation failures due to numerical instabilities. Special care needs to be taken when removing links; more specifically, before removing a link, one needs to make sure that the resulting system model remains nonsingular. In some embodiments, the design system can ensure model consistency by invoking checking and translation features of various simulation tools. Note that such features are typically invoked before model simulations.

In addition, one needs to make sure that, after elimination of links, the variables on ports used for defining the behavioral requirements (e.g., ports 101-108 shown in FIG. 1) can be affected by sources (e.g., current source 110 shown in FIG. 1) connected to boundary ports. More specifically, the design system can be configured to check the existence of at least one path between source components and boundary ports used for defining behavioral requirements. In some embodiments, the automated design system checks for the existence of such paths by implementing a breadth-first search algorithm.

Figure 6:
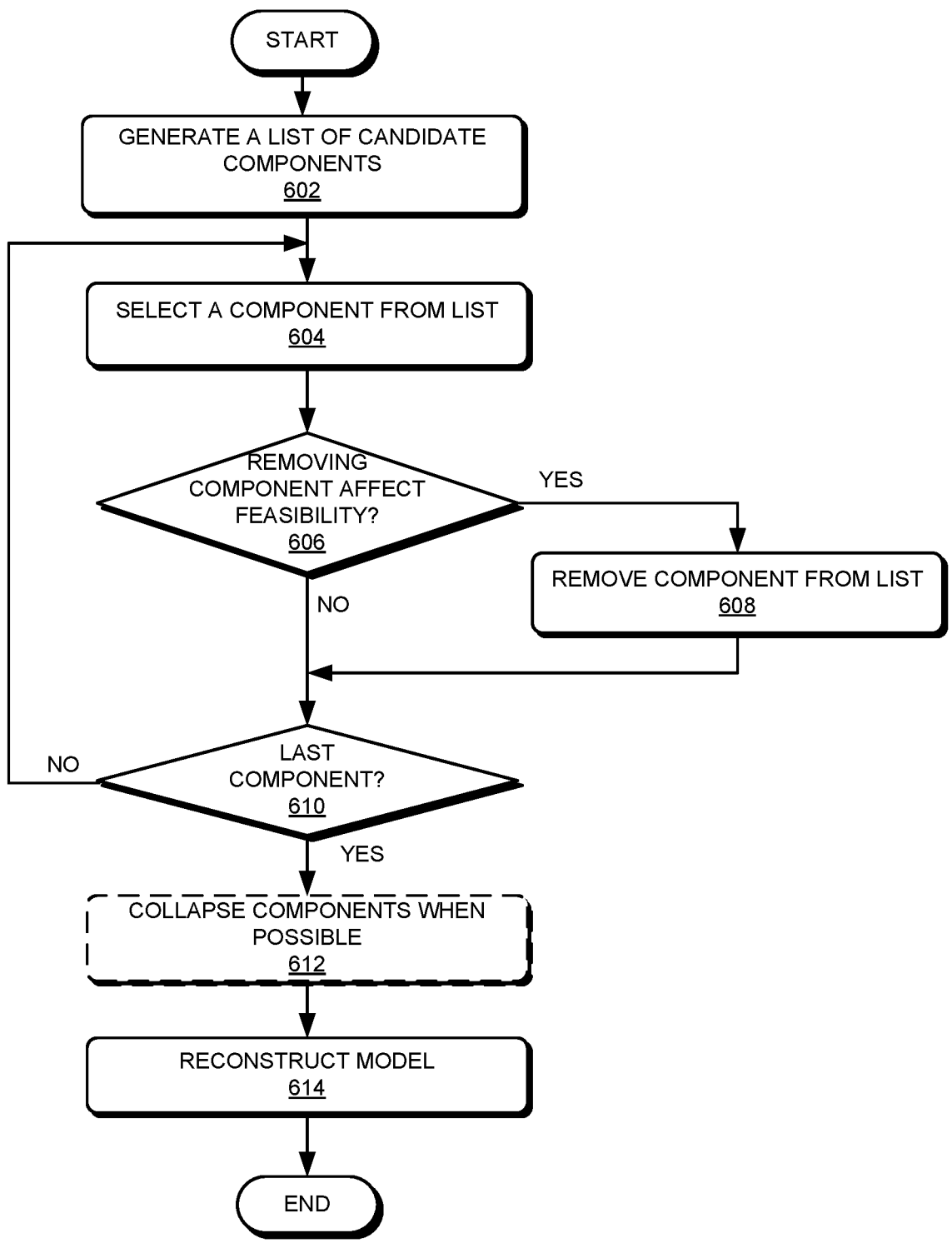
FIG. 6 presents a flowchart illustrating an exemplary model-reduction process, according to one embodiment.

FIG. 6 presents a flowchart illustrating an exemplary model-reduction process, according to one embodiment. During operation, the system generates a list of candidate components for removal based on the primal optimization solution (operation 602). As discussed previously, the primal optimization solution may indicate that certain switch values have been stabilized at zero, meaning that these switches and their corresponding components can be the candidates for removal. The system can select a component from the candidate list (operation 604), and determine whether removing the component may affect model feasibility (operation 606). For example, the system can determine if the removal of a particular candidate can result in singularity of the system or result in decoupling between a source and one or more boundary ports. If so, the system removes such a component from the candidate list (operation 608). Otherwise, nothing is done, and the system determines whether the selected component is the last component on the list (operation 610). If not, the system can select the next component (operation 604).

If all components have been tested, the system can optionally collapse multiple components into a single component when possible (operation 612). This operation depends on the type of components and their configurations. In many cases, components of the same type can be combined or collapsed into a single component, depending how they are connected to each other in the topology. For example, in the case of resistive components in parallel or in series configurations, multiple resistors can be collapsed into a single resistor depending on their in parallel or in series configurations. In addition to collapsing multiple linear components into one component, it is also possible for the design system to combine nonlinear components. For example, if there are m parallel components whose behavior can be defined by $I_j = \Sigma_{i=1}^n \alpha_{i,j} V^{2i-1}$, j=1, . . . , m, then it is possible to combine or collapse these m components into a single component whose behavior can be defined by $I = \Sigma_{i=1}^n \alpha_i V^{2i-1}$, where $\alpha_i = \Sigma_{j=1}^m \alpha_{i,j}$.

Subsequently, the system reconstructs the model by removing, from the system topology, remaining components on the candidate list (operation 614). The reconstructed model typically is less complex than the previous iteration, because it has fewer components and, hence, fewer optimization variables.

Various approaches can be used to increase the optimization efficiency. More specifically, the automated design system can adaptively change the optimization algorithm when solving the primal optimization problem. In some embodiments, during the initial learning, the design system can implement first-order, gradient-based algorithms, including the gradient decent algorithm and its variations (e.g., gradient decent with momentum, Nesterov accelerated gradient, RMSprop, Adam, Nadam, etc.), because such algorithms can work better for large-scale systems (i.e., a system having thousands of parameters). However, gradient-based algorithms are typically slow and have a linear convergence rate. To improve the computation efficiency, in some embodiments, as the number of optimization variables decreases (i.e., the number of components decreases as a result of model reduction), the design system may use a second-order algorithm (e.g., a quasi-Newton method that is specialized in solving nonlinear least-square problems) to solve the primal optimization problem. Such optimization algorithms take advantage of the quadratic structure to use the gradients only to approximate the Hessian of the cost function.

However, the primal optimization problem faced by the design system is not in a least-square form due to the presence of the $l_1$ sparsity objective function. In some embodiments, the design system can apply variable transformation to convert the primal problem into the form of least-square. Let $\varepsilon_{t_k}$ denote the error between the desired and simulated behavior at $t_k$, that is $\varepsilon_{t_k} = y_{t_k} - \hat{y}_{t_k}$. The cost function of the primal optimization problem can be expressed as:

$$\mathcal{P}(\beta, g) = 1^T g + \frac{\lambda}{N}\sum_{k=0}^{N}\varepsilon_{t_k}^T \varepsilon_{t_k} = \frac{1}{N}\sum_{k=0}^{N}\tilde{\varepsilon}_{t_k}^T \tilde{\varepsilon}_{t_k}, \text{ where}$$

$$\tilde{\varepsilon}_{t_k}^{(i)} = \sqrt{\frac{1^T g}{m} + \lambda(\varepsilon_{t_k}^{(i)})^2},$$

with $\varepsilon_{t_k}^{(i)}$ referring to the $i^{th}$ entry of $\varepsilon_{t_k}$, and m denoting the dimension of $\varepsilon_{t_k}$. Certain nonlinear least-square optimization algorithms can accept box constraints and, hence, no additional transformation of variables is necessary to remove the constraints. In addition to gradient-based algorithms, the design system can also implement gradient-free algorithms (e.g., Powell algorithm or Nelder-Mead algorithm). However, the optimization variables update is based on model simulation only and, hence, can be slow when facing a large number of variables (e.g., Powell algorithms requires n model simulations, where n is the total number of variables).

Figure 7:
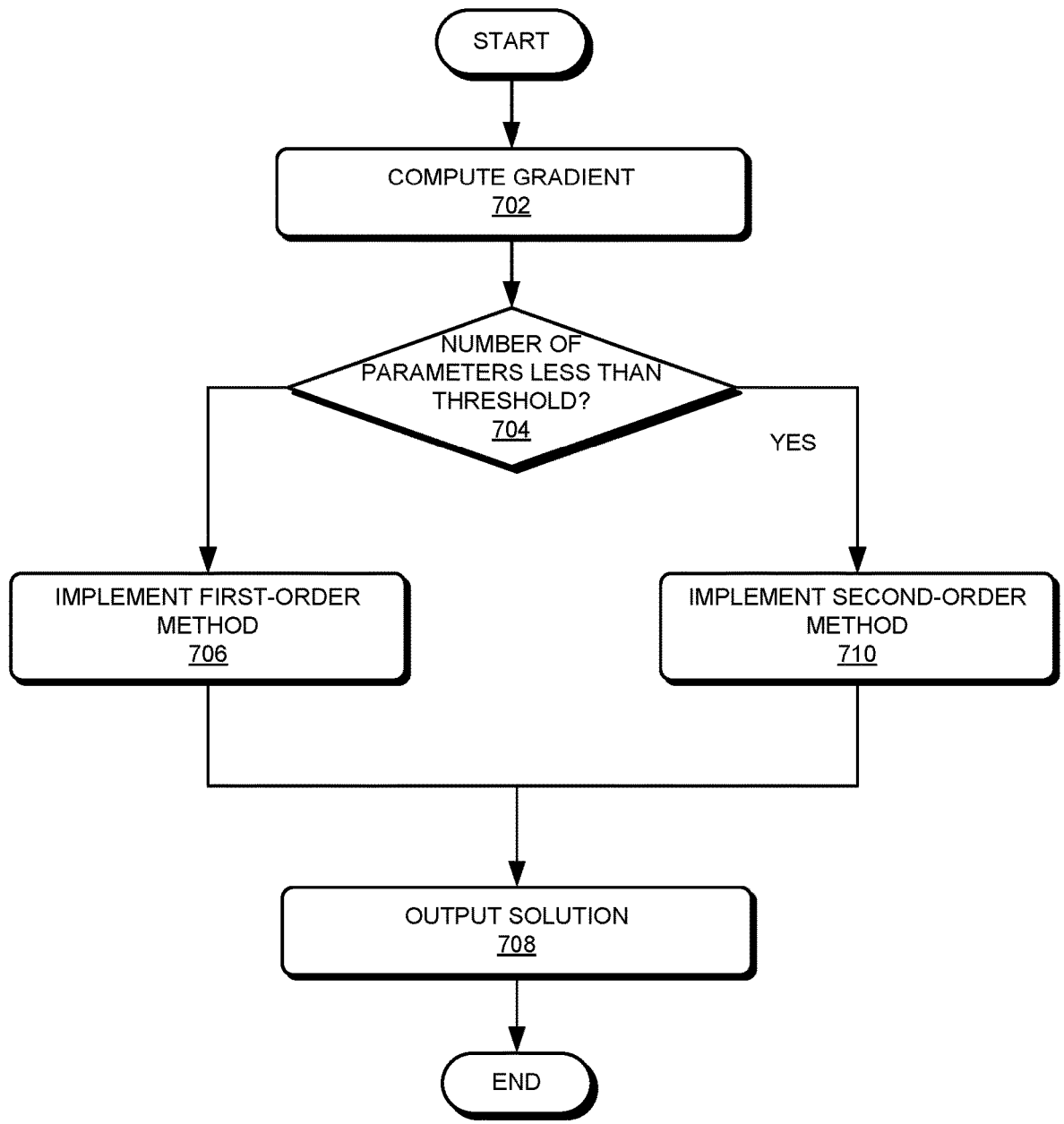
FIG. 7 presents a flowchart illustrating an exemplary process for solving the primal optimization problem, according to one embodiment.

FIG. 7 presents a flowchart illustrating an exemplary process for solving the primal optimization problem, according to one embodiment. During operation, the design system computes the gradient of the cost function (operation 702). In some embodiments, an automatic differentiation technique can be used to evaluate the derivative. The design system determines whether the number of parameters in the optimization problem has been reduced to less than a predetermined threshold (operation 704). If not, the design system implements a first-order method (e.g., gradient-based algorithms) to solve the primal optimization problem (operation 706) and outputs the solution (operation 708). Otherwise, the design system implements a second-order algorithm (e.g., a quasi-Newton method) to solve the primal optimization problem (operation 710) before outputting the solution (operation 708).

In some embodiments, the automated design system can further improve efficiency and accuracy by avoiding gradient approximations. For example, automatic differentiation techniques and numerical solver with sensitivity analysis capability can be implemented to improve efficiency and accuracy.

In some embodiments, the automated design system can be implemented on a deep-learning platform that has automatic differentiation features. To do so, the system needs to transform the primal optimization problem that includes the mode simulation into a format that is compatible with the deep learning platform. To achieve this, the system models are flattened (model hierarchy is removed) and symbolically simplified into block lower triangular forms. This step can be executed by a simulation tool (e.g., Dymola, JModelica, OpenModelica, etc.) before the simulation of a model. Next, the simplified models can be sent to a parser that uses symbolic algebra to generate objects that can be consumed by the training platforms.

In alternative embodiments, the design system can implement solvers with sensitivity analysis capabilities (e.g., CVODE). This type of solver, in addition to solving the differential-algebraic equation (DAE), can compute the sensitivity of the state variables with respect the system parameters. The latter is needed to compute the gradients of the cost function with respect to the system parameters.

Figure 8:
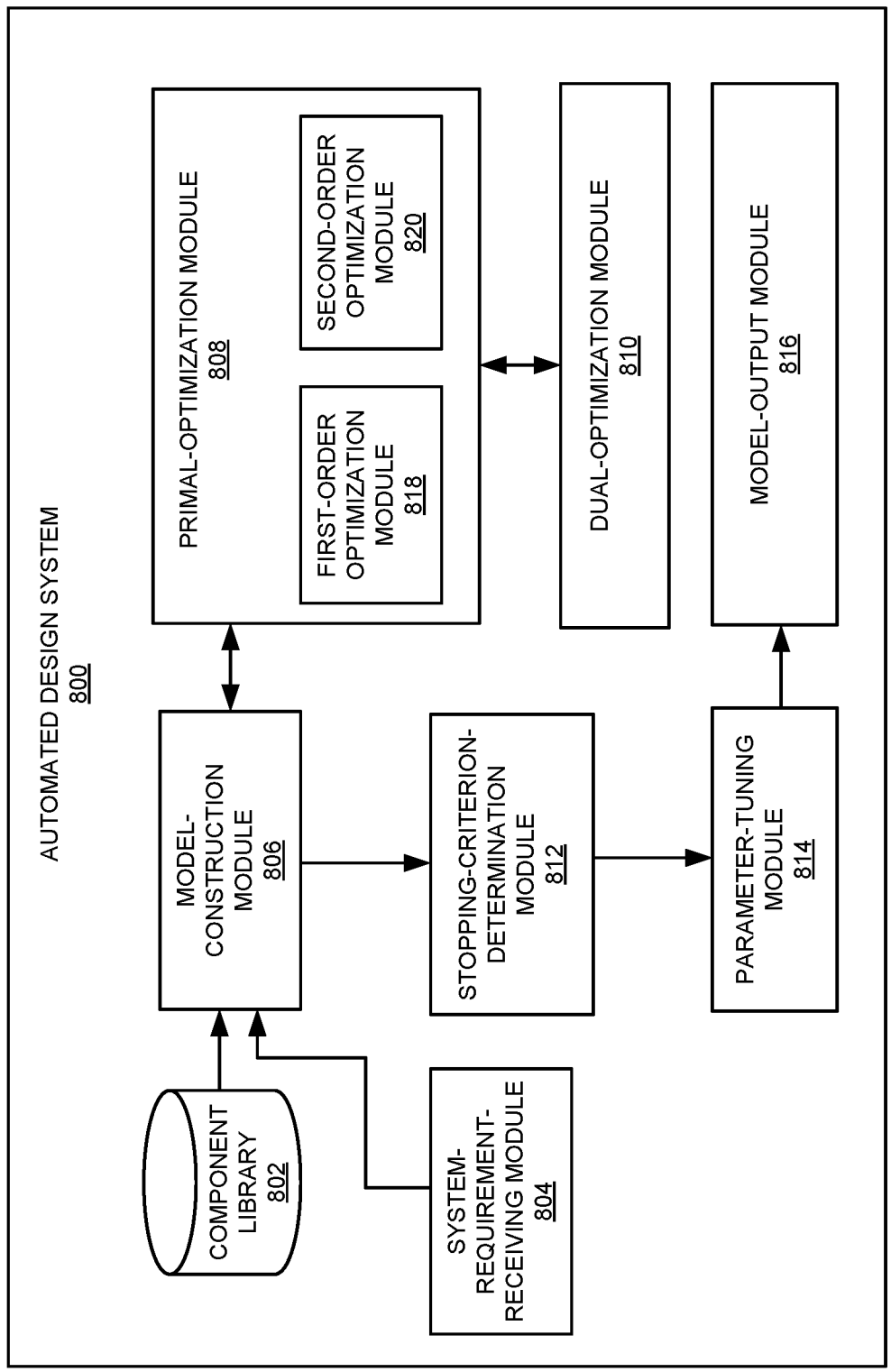
FIG. 8 shows an exemplary automated design system, according to one embodiment.

FIG. 8 shows an exemplary automated design system, according to one embodiment. Automated design system 800 can include a multi-physical-domain component library 802, a system-requirement-receiving module 804, a model-construction module 806, a primal-optimization module 808, a dual-optimization module 810, a stopping-criterion-determination module 812, a parameter-tuning module 814, and a model-output module 816. More specifically, primal optimization module 808 can include a first-order optimization module 818 and a second-order optimization module 820.

Multi-physical-domain component library 802 can be implemented as a database. Each component data entry can include the description of the behavior and interface(s) of the component. Users of automated design system 800 can add, delete, or modify entries in multi-physical-domain component library 802. It is also possible for component library 802 to accept entries from other libraries of other design or simulation tools. System-requirement-receiving module 804 can be responsible for receiving design requirements, which can include the desired behaviors and boundary conditions of the to-be-desired physical system. For example, the requirements of an electrical system can be the voltage or current response of the electrical system.

Model-construction module 806 can be responsible for constructing system models, including topology and component parameters. The initial model can be constructed based on the system requirements and available components in component library 802. Subsequent system models can be constructed based on optimization results. More specifically, model-construction module 806 can include a model-deduction sub-module that can reduce the initial complex system model to a less complex model based on optimization results of a particular iteration.

In some embodiments, automated design system 800 implements a primal-dual approach to solve the optimization problem and can include primal-optimization module 808 and dual-optimization module 810. The primal optimization problem can be a mixed-integer problem. In some embodiments, the mixed-integer problem can be converted into a nonlinear problem with constraints. To increase efficiency and the convergence speed, in some embodiments, primal-optimization module 808 can include a first-order optimization module 818 and a second-order optimization module 820. First-order optimization module 818 is configured to solve the primal problem using first-order methods, which is slow but more suitable for systems with a large number (e.g., a few thousand) of parameters, and second-order optimization module 820 is configured to solve the primal problem using second-order methods, which can be fast but can only work for systems with a relatively small number (e.g., a few hundred) of parameters. Dual-optimization module 810 can be responsible for solving the dual problem.

Stopping-criterion-determination module 812 can be responsible for determining, after each iteration, whether a stopping criterion has been reached. More specifically, stopping-criterion-determination module 812 can determine whether the cost function is sufficiently small or whether the simulated behaviors of the current designed physical system are sufficiently similar to the design requirements.

Parameter-tuning module 814 can be responsible for the final tuning of the parameters of the components. More specifically, parameter-tuning module 814 can be configured to optimize parameters of components within the designed physical system without updating the system topology. Such an operation can further improve the accuracy of the designed system. Model-output module 816 can be responsible for outputting the final design solution.

A Design Example

Figure 9:
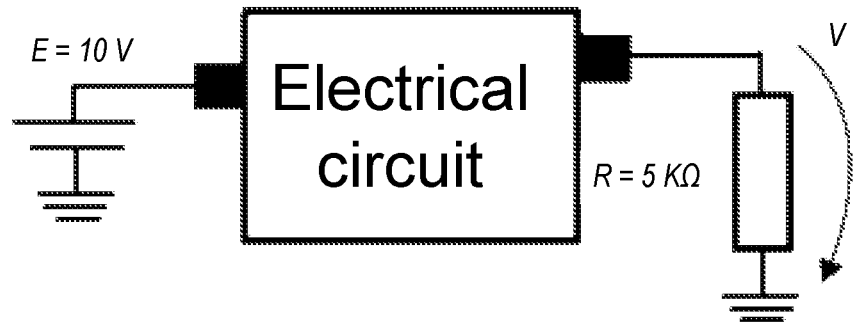
FIG. 9 illustrates the boundary conditions and required behaviors of a to-be-designed electrical circuit, according to one embodiment.
Figure 9:
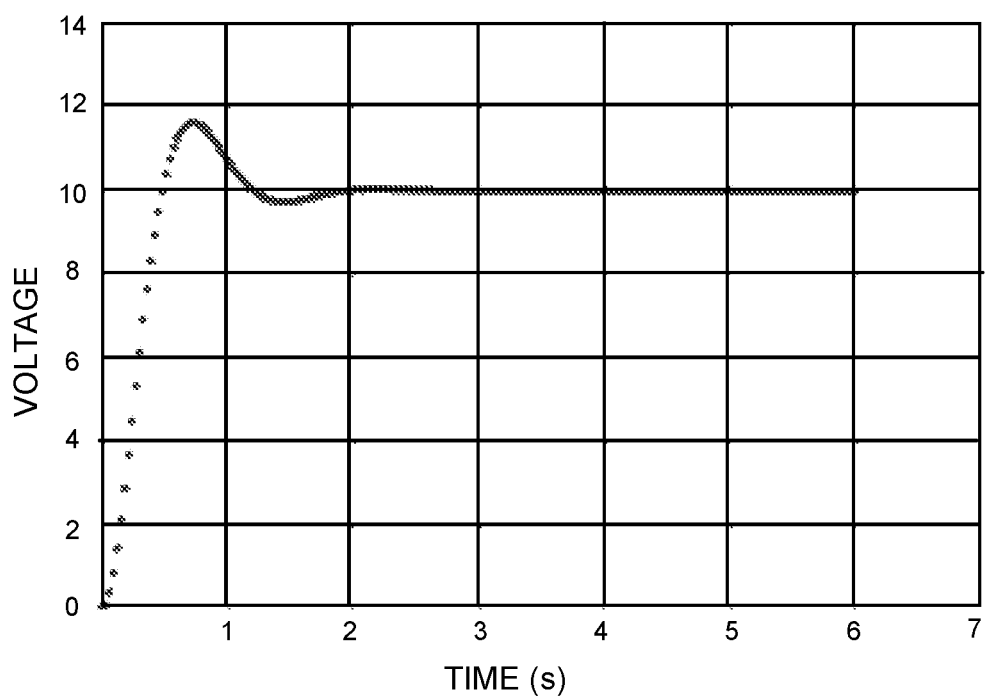

FIG. 9 illustrates the boundary conditions and required behaviors of a to-be-designed electrical circuit, according to one embodiment. More specifically, the upper drawing shows the boundary conditions, and the lower drawing shows the required behavior of the voltage across the load resistor.

Figure 10:
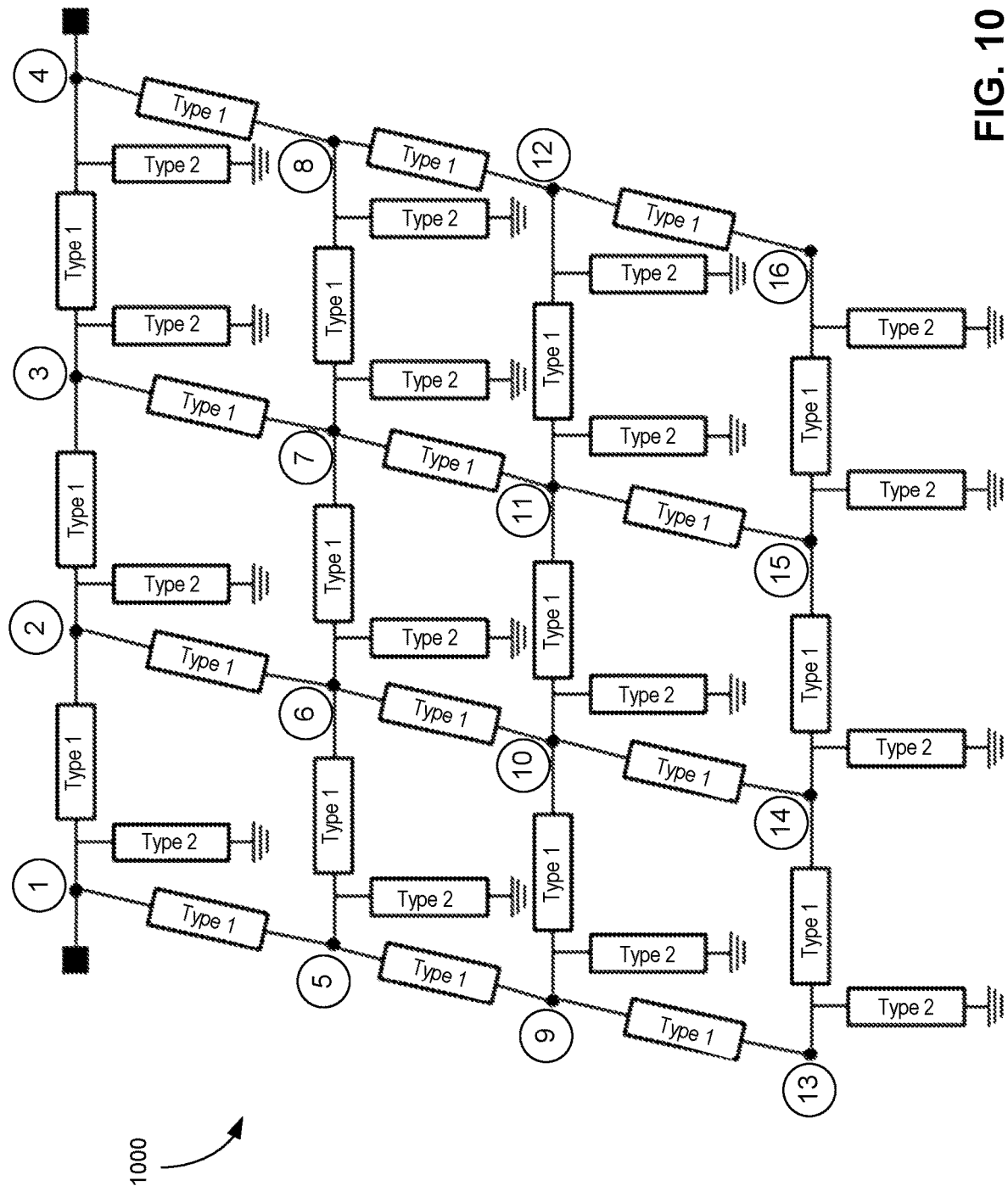
FIG. 10 illustrates an initial topology of the electric circuit, according to one embodiment.

FIG. 10 illustrates an initial topology of the electric circuit, according to one embodiment. System topology 1000 can include 16 nodes arranged in a grid structure. In this example, there are a total of 40 links, with 24 links used for connection between neighboring nodes and 16 links used for connections to the ground. Different types of links can be used in system topology 1000.

Figure 11:
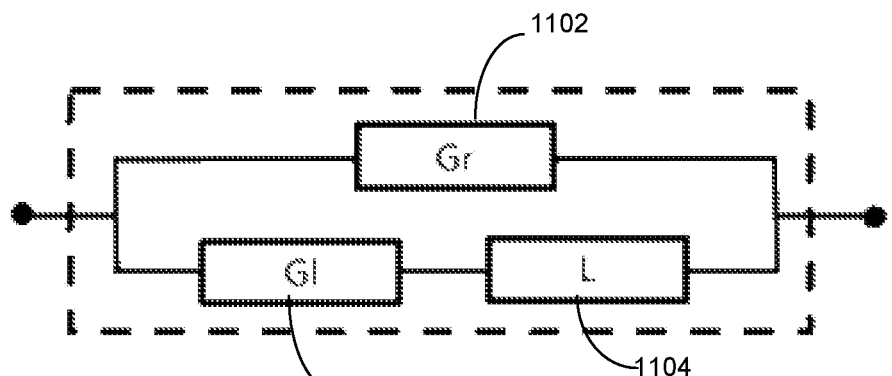
FIG. 11 illustrates the two types of links used in system topology 1000, according to one embodiment.
Figure 11:
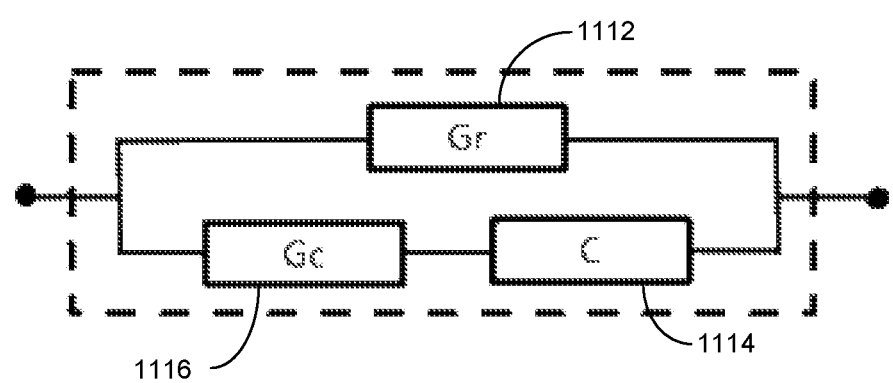

FIG. 11 illustrates the two types of links used in system topology 1000, according to one embodiment. The first type of link (e.g., type-I links), shown in the upper drawing, can each include a conductor (e.g., conductor 1102) and an inductor (e.g., inductor 1104) in parallel. Conductor 1102 can be interpreted as switch, while inductor 1104 can be separately coupled to a conductor 1106, which is interpreted as a switch. The second type of link (e.g., type-II links), shown in the lower drawing, has a conductor (e.g., conductor 1112) and a capacitor (e.g., capacitor 1114) in parallel. Similarly, conductor 1112 can be interpreted as a switch, and capacitor 1114 can be separately coupled to a conductor 1116, which is interpreted as a switch. The type-I links are used to connect neighboring nodes, whereas the type-II links are used to connect nodes to the ground. To decrease the number of parameters used, the capacitance value can also be interpreted as a switch: a small value results in a very small current, basically creating an open connection. In this example, there are a total of 104 optimization variables, with 80 variables ($G_r$ and $G_l$ for type-I links, and $G_r$ and C for type-II links) acting as switching parameters, which can be used in the $l_1$ part of the objective function.

In some embodiments, the primal optimization problem can be solved by running for a fixed number of iterations (e.g., 100 iterations). The dual problem parameter can be updated for 30 iterations. The primal problem is solved using the Powell algorithm. Without model reduction the number of operations is c×104×100×40, where the constant c defines the number of operations needed to evaluate the cost function. The cost function evaluation requires simulating the system model. In some embodiments, the system can use the Modelica language to represent the model and generate Functional Mockup Unit (FMU) objects that can be used for simulation purposes.

Figure 13A:
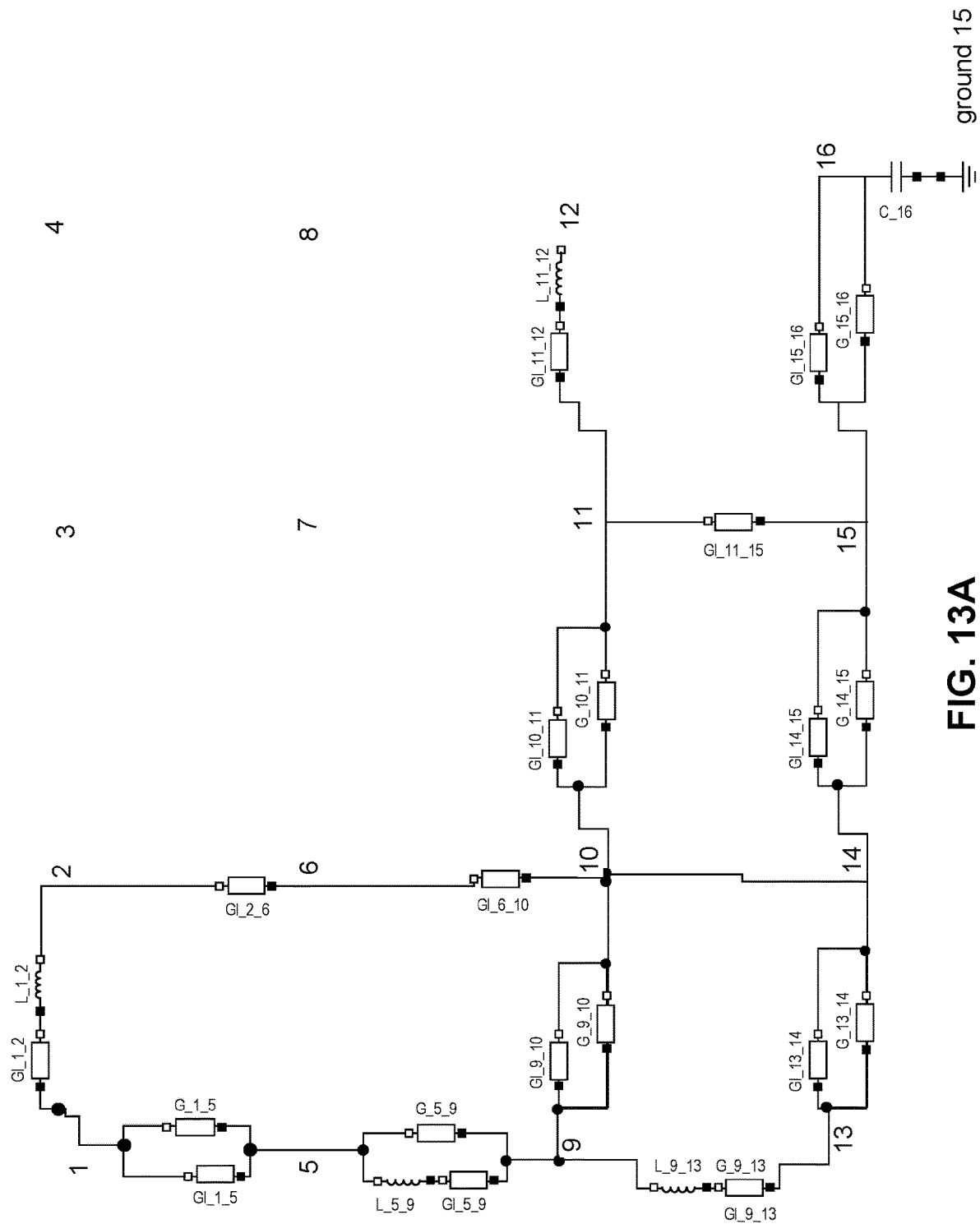
FIG. 13A and FIG. 13B show the designed circuits after 3 and 22 integrations, respectively, according to one embodiment.
Figure 13B:
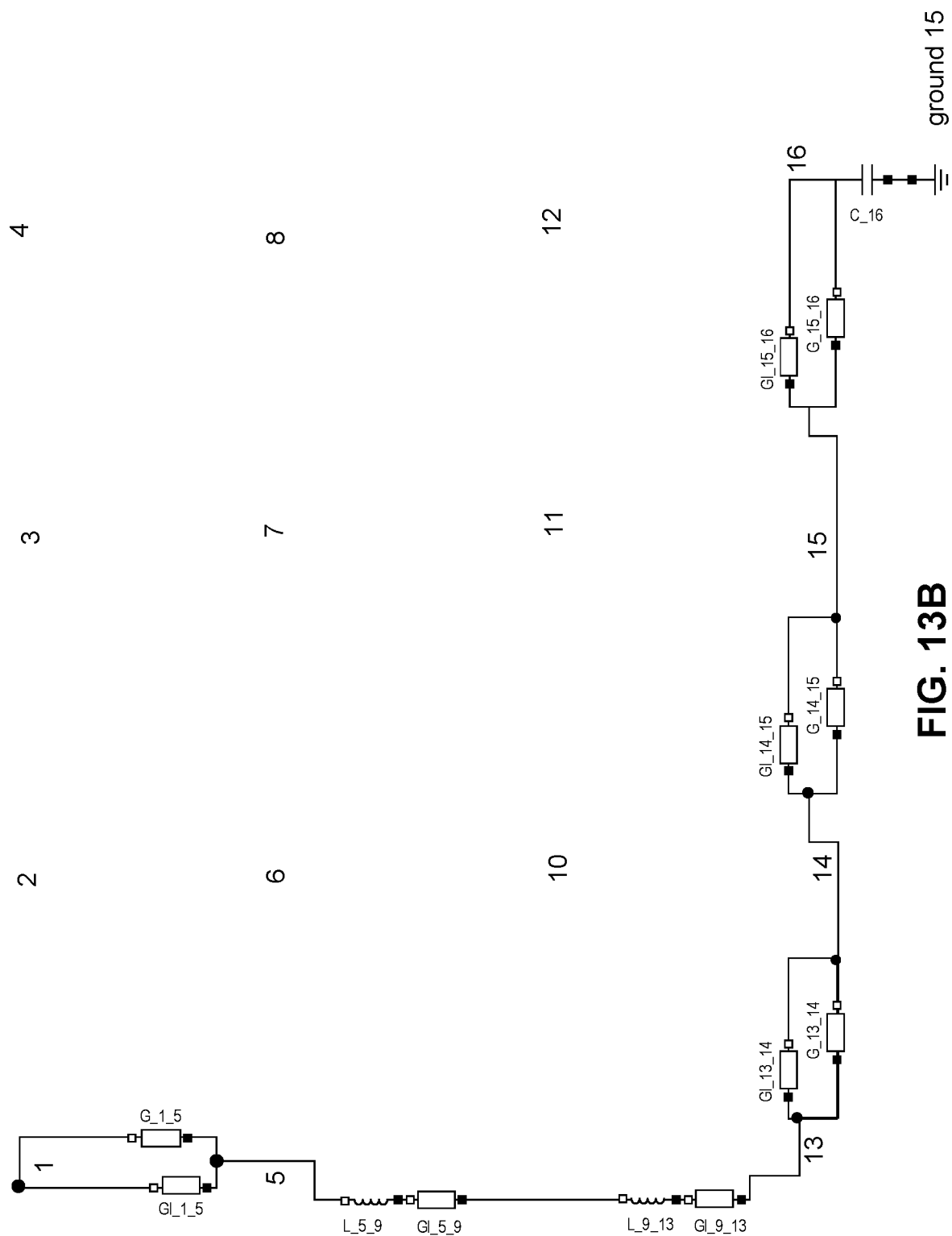
Figure 14:
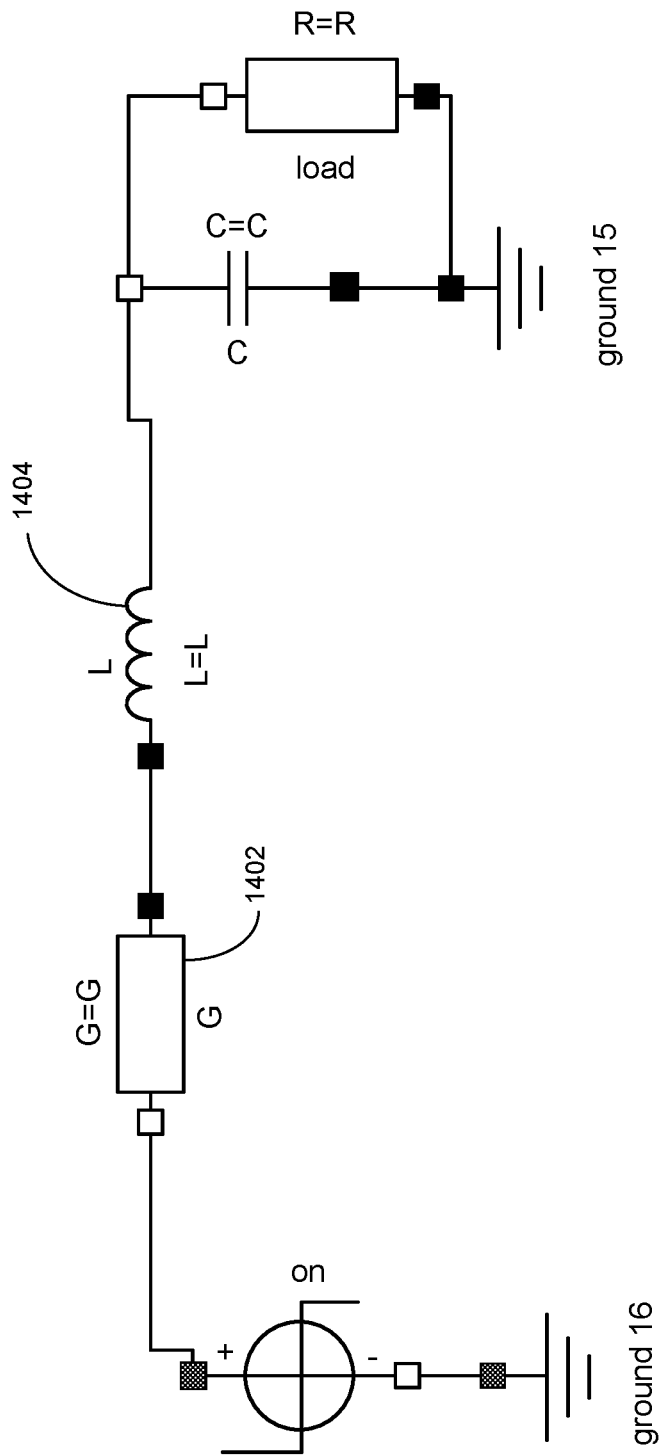
FIG. 14 shows the collapsed circuit, according to one embodiment.
Figure 15:
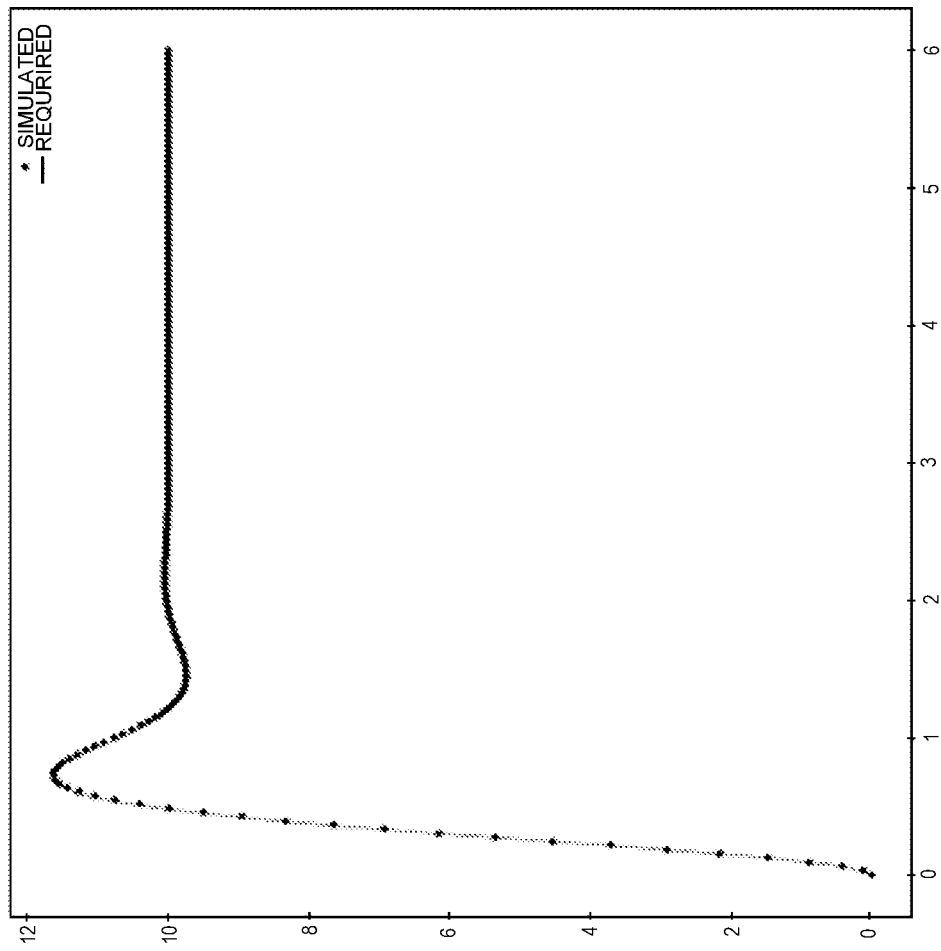
FIG. 15 shows the comparison between the simulated behavior of the designed circuit and the required behavior, according to one embodiment.

In some embodiments, the automated design system applies the primal-dual approach with model reduction using a process similar to what is shown in FIG. 5. The precision threshold of the mean-square-error cost can be set to $\varepsilon=0.001$. FIG. 12 presents a table showing the number of optimization variables at different iterations of the dual problem, according to one embodiment. As shown in the table, the number of variables decreases as the number of iterations increases. FIG. 13A and FIG. 13B show the designed circuits after 3 and 22 iterations, respectively, according to one embodiment. One can see that the number of links and the number of components are reduced significantly as the number of iterations increases. FIG. 14 shows the collapsed circuit, according to one embodiment. More specifically, multiple conductors have been collapsed into a single conductor 1402, and multiple inductors have been collapsed into a single inductor 1404. FIG. 15 shows the comparison between the simulated behavior of the designed circuit and the required behavior, according to one embodiment. A good match between the behaviors of the designed system and the required behavior can be seen in FIG. 15.

Exemplary Computer and Communication System

Figure 16:
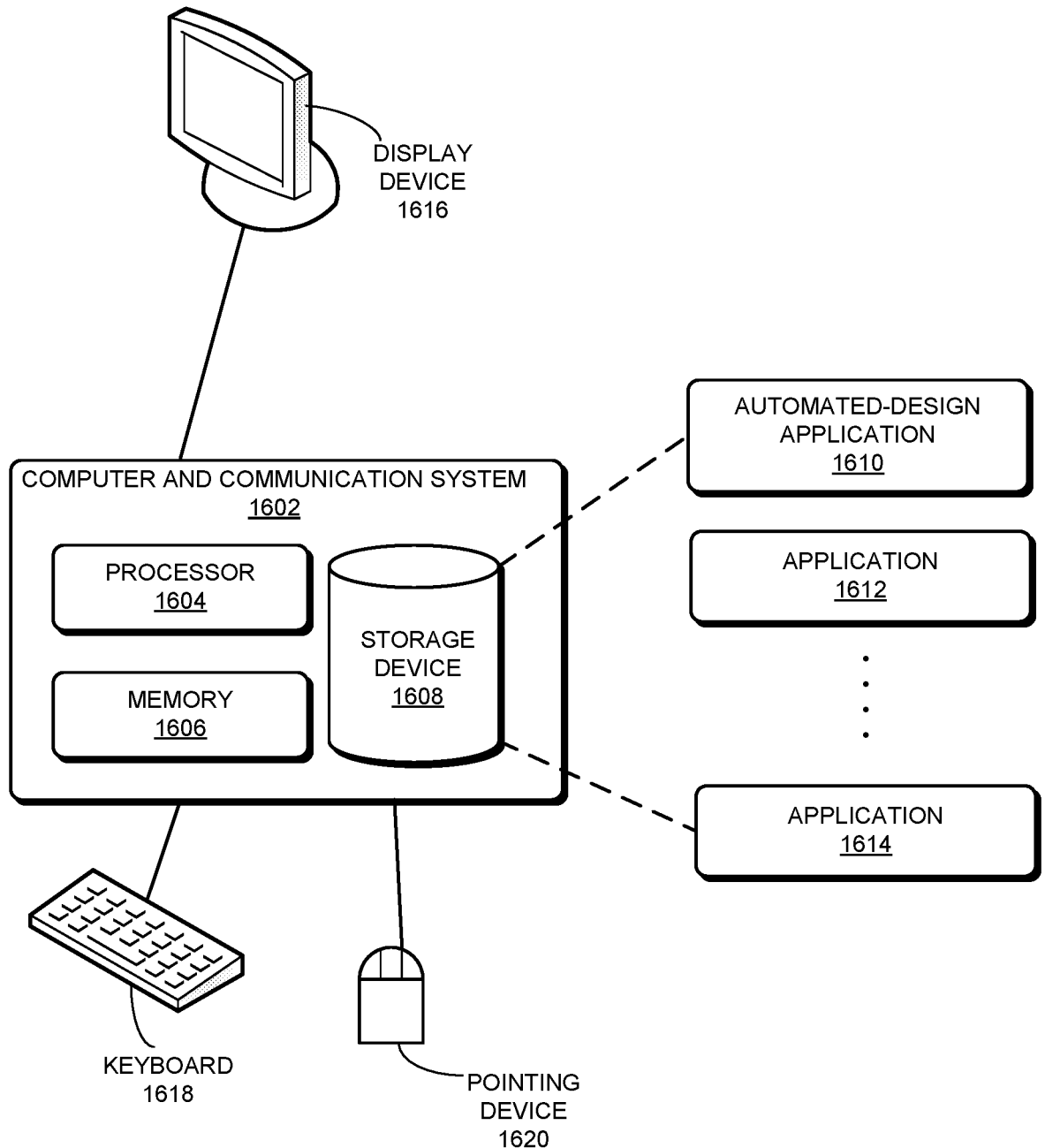
FIG. 16 illustrates an exemplary computer and communication system that facilitates automated design of a physical system, in accordance with an embodiment of the present invention.

FIG. 16 illustrates an exemplary computer and communication system that facilitates automated design of a physical system, in accordance with an embodiment of the present invention. A computer and communication system 1602 includes a processor 1604, a memory 1606, and a storage device 1608. Storage device 1608 stores an automated-design application 1610, as well as other applications, such as applications 1612 and 1614. During operation, automated-design application 1610 is loaded from storage device 1608 into memory 1606 and then executed by processor 1604. While executing the program, processor 1604 performs the aforementioned functions. Computer and communication system 1602 is coupled to an optional display 1616, keyboard 1618, and pointing device 1620.

In general, embodiments of the present invention provide a system and method for facilitating automated design of a physical system. More specifically, the automated design system can start with an initial richly connected system topology and implement various optimization techniques to prune the initial system topology and tune component parameters until a system with desired behavior can be achieved. In some embodiments, a respective link in the initial system topology can include all possible components coupled in parallel via selection switches. Through optimization, the design system is able to remove links and components that are not necessary in the final system.

Although the example shown in FIGS. 9-15 is for designing an analog electrical circuit, the same principle can be implemented into other types of physical systems, such as a digital circuit, a mixed analog-digital circuit, a mechanical system, an electro-mechanical system, a thermal system, a hydraulic system, etc.

In the example shown in FIG. 5, a primal-dual approach is used to solve the optimization problem. In practice, other optimization approaches can also be possible. Moreover, a number of optimization algorithms, including both gradient-based algorithms and gradient-free algorithms, can be used to solve the primal and/or dual problem. The scope of this disclosure is not limited to the detailed optimization algorithms.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for automated design of a physical system, comprising:
   obtaining, by a computer, a component library comprising a plurality of physical components;
   receiving design requirements of the physical system;
   constructing an initial system model based on physical components in the component library and the design requirements, wherein a system topology associated with the initial system model comprises a large number of links that are coupled to one another, and wherein a respective link comprises one or more physical components;
   performing an optimization operation comprising a plurality of iterations, wherein the system topology is updated at each iteration, and wherein updating the system topology comprises removing links and components from the system topology;
   generating a final system model based on an outcome of the optimization operation; and
   outputting a design solution of the physical system according to the final system model.

2. The method of claim 1, wherein the design requirements comprise boundary conditions and desired behavior of the physical system.

3. The method of claim 1, wherein a respective component within the respective link is coupled to an adjacent node in the system topology via a selection switch, and wherein a state of the selection switch indicates whether the respective component is removable from the system topology.

4. The method of claim 1, wherein performing the optimization operation further comprises solving a primal-dual optimization problem, and wherein each iteration comprises:
   solving a primal optimization problem; and
   updating at least one dual optimization variable.

5. The method of claim 4, wherein solving the primal optimization problem further comprises:
   determining whether variables in the primal optimization problem exceed a predetermined number;
   if so, solving the primal optimization problem using a first-order method; and
   if not, solving the primal optimization problem using a second-order method.

6. The method of claim 5, wherein the first-order method implements a gradient-descent algorithm, and wherein the second-order method implements a quasi-Newton algorithm.

7. The method of claim 1, wherein generating the final system model further comprises:
   combining multiple components of a same type into a single component based on a topology relationship among the multiple components; and
   updating parameters of physical components remaining in a final topology associated with the final system model without updating the final topology.

8. A non-transitory computer-readable storage medium storing instructions that when executed by a computer cause the computer to perform a method for automated design of a physical system, the method comprising:
   obtaining a component library comprising a plurality of physical components;
   receiving design requirements of the physical system;
   constructing an initial system model based on physical components in the component library and the design requirements, wherein a system topology associated with the initial system model comprises a large number of links that are coupled to one another, and wherein a respective link comprises one or more physical components;
   performing an optimization operation comprising a plurality of iterations, wherein the system topology is updated at each iteration, and wherein updating the system topology comprises removing links and components from the system topology;
   generating a final system model based on an outcome of the optimization operation; and
   outputting a design solution of the physical system according to the final system model.

9. The non-transitory computer-readable storage medium of claim 8, wherein the design requirements comprise boundary conditions and desired behavior of the physical system.

10. The non-transitory computer-readable storage medium of claim 8, wherein a respective component within the respective link is coupled to an adjacent node in the system topology via a selection switch, and wherein a state of the selection switch indicates whether the respective component is removable from the system topology.

11. The non-transitory computer-readable storage medium of claim 8, wherein performing the optimization operation further comprises solving a primal-dual optimization problem, and wherein each iteration comprises:
    solving a primal optimization problem; and
    updating at least one dual optimization variable.

12. The non-transitory computer-readable storage medium of claim 11, wherein solving the primal optimization problem further comprises:
    determining whether variables in the primal optimization problem exceed a predetermined number;
    if so, solving the primal optimization problem using a first-order method; and
    if not, solving the primal optimization problem using a second-order method.

13. The non-transitory computer-readable storage medium of claim 12, wherein the first-order method implements a gradient-descent algorithm, and wherein the second-order method implements a quasi-Newton algorithm.

14. The non-transitory computer-readable storage medium of claim 8, wherein generating the final system model further comprises:
    combining multiple components of a same type into a single component based on a topology relationship among the multiple components; and
    updating parameters of physical components remaining in a final topology associated with the final system model without updating the final topology.

15. A computer system for automated design of a physical system, the computer system comprising:
    a processor;
    a storage device coupled to the processor and storing instructions which when executed by the processor cause the processor to perform a method, wherein the method comprises:
       obtaining a component library comprising a plurality of physical components;
       receiving design requirements of the physical system;
       constructing an initial system model based on physical components in the component library and the design requirements, wherein a system topology associated with the initial system model comprises a large number of links that are coupled to one another, and wherein a respective link comprises one or more physical components;

performing an optimization operation comprising a plurality of iterations, wherein the system topology is updated at each iteration, and wherein updating the system topology comprises removing links and components from the system topology;

generating a final system model based on an outcome of the optimization operation; and outputting a design solution of the physical system according to the final system model.

16. The computer system of claim 15, wherein the design requirements comprise boundary conditions and desired behavior of the physical system.

17. The computer system of claim 15, wherein a respective component within the respective link is coupled to an adjacent node in the system topology via a selection switch, and wherein a state of the selection switch indicates whether the respective component is removable from the system topology.

18. The computer system of claim 15, wherein performing the optimization operation further comprises solving a primal-dual optimization problem, and wherein each iteration comprises:

solving a primal optimization problem; and updating at least one dual optimization variable.

19. The computer system of claim 18, wherein solving the primal optimization problem further comprises:

determining whether variables in the primal optimization problem exceed a predetermined number;

if so, solving the primal optimization problem using a first-order method, wherein the first-order method implements a gradient-descent algorithm; and if not, solving the primal optimization problem using a second-order method, wherein the second-order method implements a quasi-Newton algorithm.

20. The computer system of claim 15, wherein generating the final system model further comprises:

combining multiple components of a same type into a single component based on a topology relationship among the multiple components; and updating parameters of physical components remaining in a final topology associated with the final system model without updating the final topology.

* * * * *